April 21, 1953 — A. S. WATKINS ET AL — 2,635,288
FEEDING HEAD FOR INJECTION MOLDING APPARATUS
Filed March 15, 1951 — 3 Sheets-Sheet 1
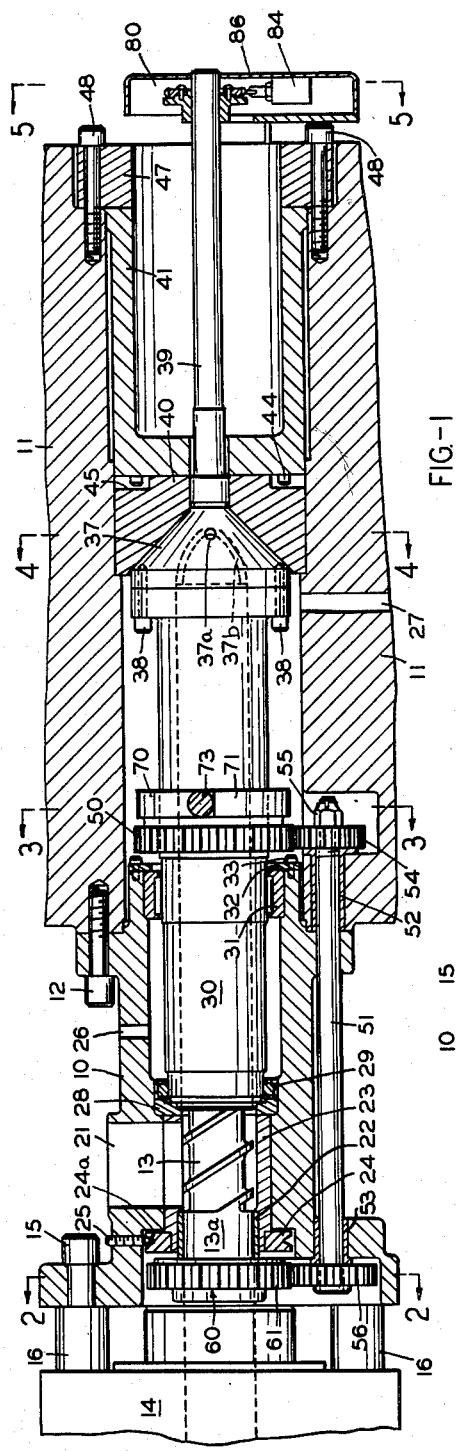
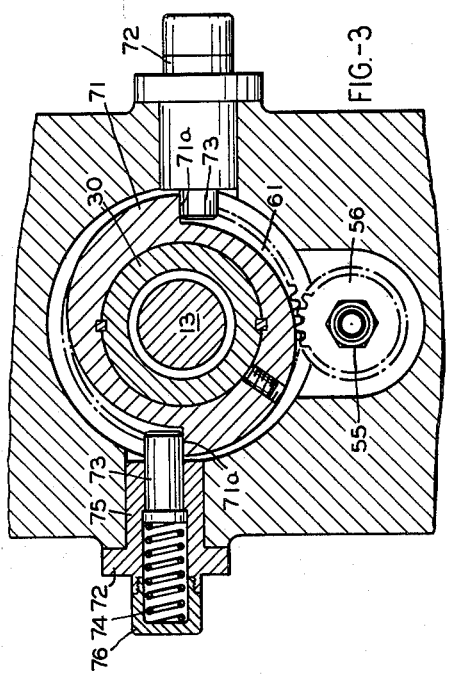
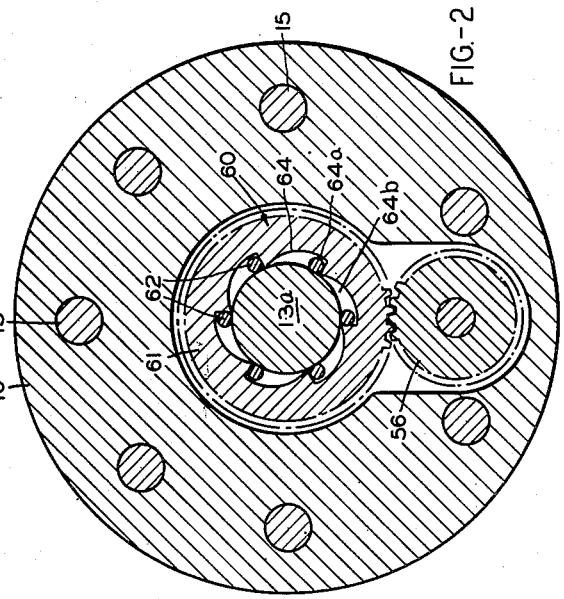
*INVENTORS*
ARTHUR S. WATKINS &
GEORGE L. WARSACK
BY
Hyde, Meyer, Baldwin & Doran
ATTORNEYS

*INVENTORS*
ARTHUR S. WATKINS &
GEORGE L. WARSACK
BY
Hyde, Meyer, Baldwin & Doran
ATTORNEYS Patented Apr. 21, 1953

2,635,288

UNITED STATES PATENT OFFICE 2,635,288

FEEDING HEAD FOR INJECTION MOLDING APPARATUS

Arthur S. Watkins and George L. Warsack, Port Clinton, Ohio, assignors to Produx Corporation, Port Clinton, Ohio, a corporation of Ohio Application March 15, 1951, Serial No. 215,838

9 Claims. (Cl. 18—30)

This invention pertains to injection molding apparatus and more particularly to a feeding head for such apparatus by means of which a mass of plastic material may be introduced under pressure into a mold cavity.

An object of the invention is to provide a feeding head which may be used in conjunction with a plurality of molds which are successively used and re-used.

Another object is to provide a feeding head having a positionable element therein whereby to direct the plastic material to any one of a plurality of molds.

Another object is to provide such a device in which the plastic material is advanced by means of a screw conveyor adapted to interrupt the feed of the material while the feed path is being changed from one mold to another.

Another object is to provide a device by means of which plastic material may be fed to any one of a plurality of molds by a screw conveyor which is reversibly rotatable, and, when reversed, is adapted to rotate a positionable nozzle whereby to change the path of feed from one mold to another.

Another object is to provide such a device in which the feed is automatically re-started when the mold changing cycle is completed and the path to the successive mold opened.

Further objects and advantages of the invention will become apparent from the following description of several preferred embodiments thereof.

In the drawings, in which like numerals refer to like parts throughout,

Fig. 1 is a longitudinal sectional view of an embodiment of the invention adapted for use in conjunction with two molds;

Fig. 2 is an enlarged vertical sectional view taken on the line 2—2 of Fig. 1 and showing the overrunning clutch mechanism;

Fig. 3 is an enlarged vertical sectional view taken on the line 3—3 of Fig. 1 and showing the locking device;

Figure 4:
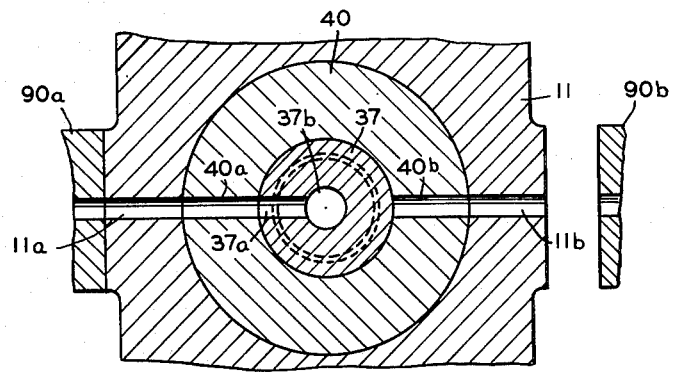
Fig. 4 is an enlarged vertical sectional view taken on the line 4—4 of Fig. 1 and showing the sprue arrangement.

Although two embodiments of the invention adapted for use in conjunction with two or four molds are described in detail herein, it is to be understood that the invention is not limited by the number of molds with which it is used. It is to be further understood that the terms and phrases used herein are merely descriptive and illustrative and do not limit the invention beyond the definitions of the appended claims.

This invention relates in general to a screw conveyor which feeds plastic material through a rotatable nozzle into any one of a plurality of molds. After one mold has been properly filled and the next cycle started, the screw conveyor rotates in a reverse direction, and means is provided to cause the nozzle to rotate therewith. When the sprue of the nozzle is aligned with the proper sprue of a fixed element surrounding the nozzle, rotation is stopped. Forward feed movement of the screw conveyor is then automatically started when the corresponding mold is closed and is ready to receive the plastic material. The nozzle is adapted to rotate only when the screw conveyor rotation is reversed, and therefore remains stationary, with the sprues aligned, until the mold is filled and another cycle started.

As here shown, the moving parts of the feeding head are contained within a housing 10 and a casting 11 to which the housing is attached by means of bolts 12. A longitudinal bore of varying diameter extends through both the housing 10 and the casting 11. A screw conveyor 13 extends into the longitudinal bore from a transmission mechanism, designated generally by the numeral 14, and which is attached to the housing 10 by means of bolts 15 and spaced therefrom by separators 16. Power is supplied to the transmission mechanism and thence to the screw conveyor by an electric motor (not shown). Means is provided whereby the screw conveyor can be rotated in either a forward or a reverse direction and may consist of a well-known mechanism such, for example, as reversing means in the transmission or a reversing circuit for the motor. Mounted near the end of the screw conveyor 13, on the smooth portion 13a adjacent the transmission mechanism 14, is an over-running clutch and gear combination, designated generally by the numeral 60, which will be later described. An aperture 21 extends through the housing 10 and through a sleeve 23, and provides means by which plastic material may be fed into the screw conveyor 13 from a feed hopper (not shown). Sealing means comprising the bronze bearing 22, the sleeve 23, and the adjustment ring 24 insure that none of the plastic material will escape from the housing into the clutch mechanism. As the bearing wears, slack is taken up by adjusting set screws 25 which bear against one side of a V-shaped channel 24a cut into the periphery of the adjustment ring 24. As the screws 25 are advanced inwardly, the adjustment ring 24 is forced toward the aperture 21. On the other side of the feed hopper entrance 21, sealing means is also provided comprising a bronze bearing 28 and a seal 29.

Surrounding the screw conveyor 13 and extending into the casting 11 is a sleeve 30, rotatably supported by the previously mentioned bearing 28 and a bearing assembly 31, which is held in place by a removable annulus 32 attached to the housing 10 by screws 33. An aperture 26 through the housing 10 and an aperture 27 through the casting provide means whereby coolant may be circulated around the sleeve 30. The inside diameter of the sleeve 30 is just slightly larger than the major diameter of the screw conveyor 13 so that plastic material will be advanced by rotation of the conveyor. A nozzle 37 is attached by bolts 38, to the end of the sleeve 30, in axial alignment therewith and a shaft 39, made integral with the nozzle 37, extends through the fixed element 40, the front wall of a pressure cap 41, and throughout the remainder of the casting bore. The nozzle 37 is of a conical shape and has a hollowed-out portion 37b on its axis into which the end of the screw conveyor 13 projects and into which the plastic material is fed. A sprue 37a extends through the wall of the nozzle into the hollowed-out portion 37b. Bearing against the nozzle and having a complementary surface configuration is a fixed element 40, held in place by a pressure cap 41, and radially positioned by pins 44 which fit into slots 45 cut therein. A ring 47, attached to the casting 11 by bolts 48, retains the pressure cap 41 and fixed element 40 in position. The fixed element 40 also has sprues 40a and 40b extending through its walls and lying in the same plane as the nozzle sprue 37a so that communication may be established between the nozzle sprue and either of the annulus sprues by properly rotatably positioning the nozzle. Sprues 11a and 11b in the casting are aligned with and connect to the fixed element sprues 40a and 40b, and in turn lead into the molds 90a and 90b as shown in Fig. 4. In the embodiment here shown and described, only two molds are used. However, the machine may be adapted for a greater number of molds by merely increasing the number of sprues in the fixed element and casting, and by making corresponding changes in a locking device and a cam assembly as will be later described.

The nozzle is rotated with respect to the fixed element by gearing which releasably connects the sleeve to the screw conveyor. Keyed to the sleeve 30, adjacent the needle bearing assembly 31, is a gear 50. A shaft 51, one end of which is mounted in the bearing 52 in the casting 11 and the other end of which is supported in the bearing 53 in the casing 10, carries on one end thereof a gear 54 which meshes with the gear 50. A nut 55, threaded on the end of the shaft, retains the gear 54 in place. On the other end, the shaft 51 carries a gear 56 which meshes with the gear 61 of the previously mentioned overrunning clutch assembly 60.

As shown in Fig. 2, the over-running clutch assembly 60 comprises generally a gear 61 and means to cause the gear to remain stationary while the conveyor shaft 13a rotates in one direction or to be fixed to the shaft 13a so as to be rotated thereby when the shaft 13a rotates in the opposite direction. A plurality of wedge-shape grooves 64 are cut into the hub of the gear 61, and in each of them is a pin or roller 62. When the shaft 13a is rotated in a clockwise direction (Fig. 2), the rollers 62 rotate freely in the outer portion 64a of the groove; when the shaft rotates in a counterclockwise direction, the rollers are wedged into the smaller inner portion 64b and so effectively lock the gear 61 to the conveyor shaft 13a. When the shaft is again rotated in a clockwise direction the gear tends to rotate with it, but when any resistance is met, the rollers 62 are freed from their wedged position and the shaft no longer turns the gear but rotates freely inside its hub.

Also mounted on the sleeve 30 is a locking device, shown generally by the numeral 70, whose function is to properly position the nozzle. It is seen in Fig. 3 that the locking device comprises generally a cam 71 mounted on the sleeve 30 and a pair of stop members 72. The stop members 72 each comprise a plunger 73 actuated toward the cam by a coil spring 74 held within the housing 75 by a plug 76. Therefore, as seen in Fig. 3, the cam 71 may rotate in a counterclockwise direction, but may rotate at the most only 180° in a clockwise direction before its motion is stopped by engagement of the stopping surfaces 71a and 71b with the plungers 73. Therefore, the nozzle 37, being attached to the sleeve 30, may rotate in a counterclockwise direction, but will be stopped by the locking device 70 at one of two positions when attempting to rotate in a clockwise direction. The positions at which the nozzle is stopped, of course, are those at which its sprue is aligned with the sprues in the fixed element. Were additional sprues provided in the fixed element, it would be necessary only to replace the cam 71 with another having a proper number of stopping surfaces positioned to correspond to the sprues in the fixed element.

Figure 5:
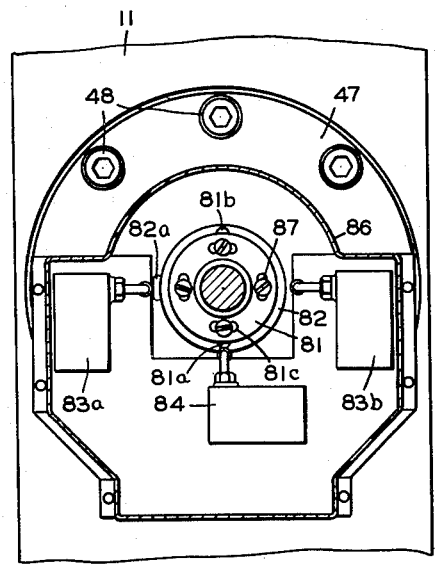
Fig. 5 is an enlarged vertical sectional view taken on the line 5—5 of Fig. 1 and showing the cam assembly.

Mounted on the end of the nozzle shaft 39 is a cam assembly 80 which cooperates with locking device 70 to control the positioning of the nozzle 37 and the rotation of the screw conveyor 13. The assembly, contained within the housing 86, comprises the cams 81 and 82 and the microswitches 83a, 83b, and 84 associated therewith. Lands 81a and 81b on the cam 81 correspond in radial position to the surfaces 71a and 71b of the locking assembly cam 71, and the land 82a corresponds in position to the sprue in the nozzle 37 and rotates therewith. As is seen from Fig. 5, the microswitches 83a and 83b are actuated by the cam 82, and the microswitch 84 is actuated by the cam 81. The cam 82 is mounted on the shaft 39 and the cam 81 adjustably held on the cam 82 by screws 87 through arcuate slots 81c.

The electrical control circuit (not shown) is hereinafter described for the purposes of clarifying the operation of the feeding head. Associated with each of the molds 90a and 90b is a push-button by means of which an operator controls the closing of the mold. Also associated with each mold and mounted thereon in a position to be actuated by the closing of the mold is a microswitch which starts rotation of the screw conveyor 13 in a forward or feeding direction. Plastic material is fed into the screw conveyor and advanced thereby through the nozzle sprue, one of the fixed element sprues and the corresponding casting sprue, into the mold. Means are provided on each mold whereby the operator may visually determine when the mold is properly filled, and when this point is reached, the operator manually stops the forward rotation of the screw conveyor and starts its backward rotation. As previously pointed out, the over-running clutch 60 transmits this backward rotation to the sleeve 30, the nozzle 37, the shaft 39, and the cams 81 and 82. When the microswitch 84 is actuated by either of the lands 81a or 81b, the backward rotation of the screw conveyor and nozzle is stopped and the nozzle sprue is slightly misaligned with a fixed element sprue because the nozzle has been rotated far enough to make certain that the surfaces 71a and 71b have passed the plungers 73. At this time, if the cams 81 and 82 are properly adjusted relative to each other, the land 82a will have closed either the microswitch 83a or the microswitch 83b. The microswitch 83a is connected in series in the previously mentioned push-button circuit for the mold 90a, and the microswitch 83b is similarly connected with respect to mold 90b. Therefore, it is seen that a mold cannot be closed unless the proper microswitch is closed by the cam 82, which means that the nozzle 37 must be in position to feed into the mold which it is desired to close. If this circuit is completed, the mold will start to close when the operator pushes the proper button and, when closed, will actuate a switch which starts the forward rotation of the conveyor. As before noted, the nozzle sprue is slightly misaligned with the fixed element sprue and the friction between the screw conveyor 13, the plastic material and the sleeve 30 will turn the nozzle until the locking cam surfaces 71a and 71b are stopped by the plungers 73, at which point the sprues are aligned. The mold is then filled and, when the operator visually determines that the filling is completed, a new cycle is started.

Figure 6:
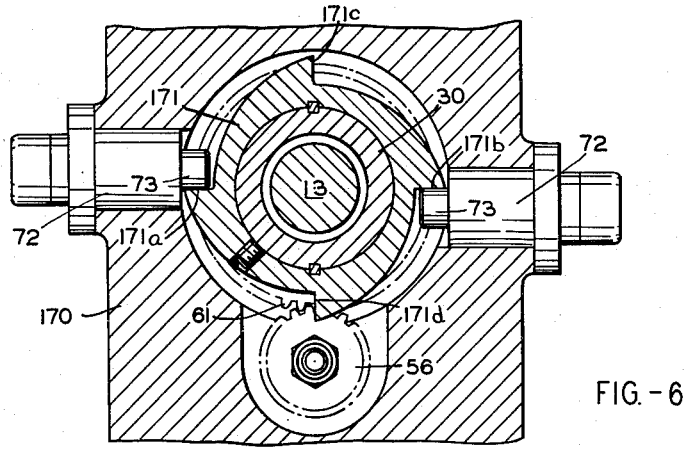
Fig. 6 is a vertical sectional view similar to Fig. 3 but showing a locking device for an embodiment adapted for use with four molds.
Figure 7:
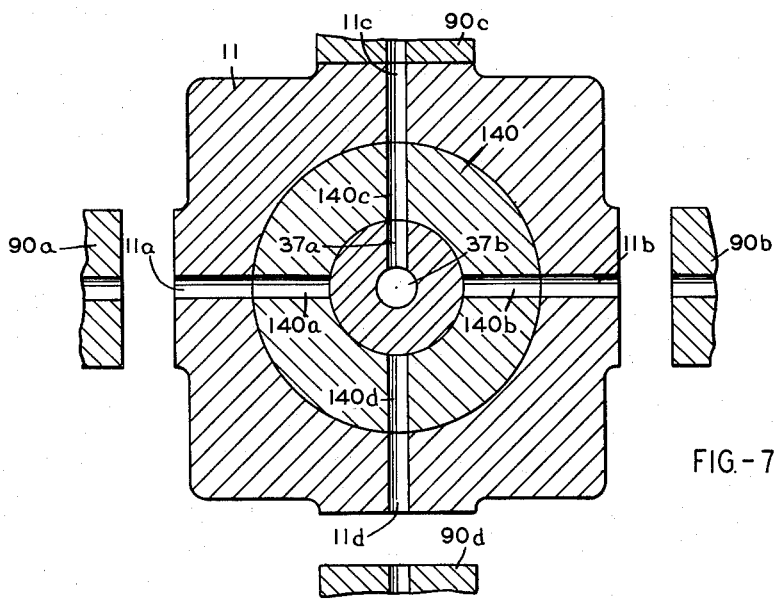
Fig. 7 is a vertical sectional view similar to Fig. 4 but showing a sprue arrangement adapted to feed four molds.
Figure 8:
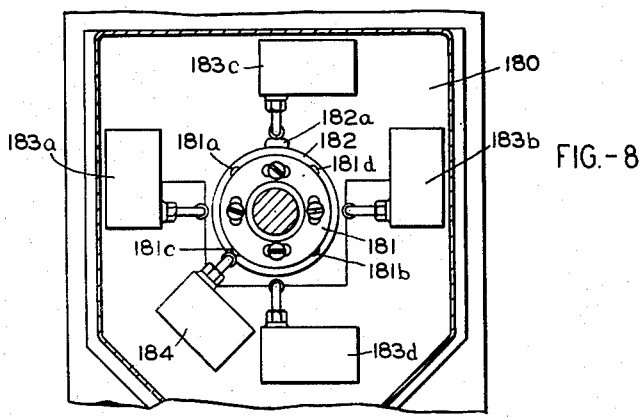
Fig. 8 is a vertical sectional view similar to Fig. 5 but showing the cam assembly used in the adaptation for feeding four molds.

In Figs. 6, 7 and 8, there are shown various parts necessary to adapt the previously described embodiment for use in conjunction with four molds instead of two. All parts and operational features not hereinafter specifically mentioned are the same as those previously described.

It was previously mentioned that the locking device could be easily adapted for a different number of molds. As shown in Fig. 6, such an adaptation for four positions of the rotatable nozzle comprises a cam 171 having cut thereon four stopping surfaces 171a, 171b, 171c, and 171d. Again, as in the first described embodiment, the cam is mounted on the sleeve 30 and rotates therewith. Engagement of the stopping surfaces with the plungers 73 prevents rotation of the sleeve in a clockwise direction and stops the sleeve in one of four positions when attempting to rotate in that direction. These positions, of course, correspond to those at which the nozzle sprue 37a (which rotates with the cam) is registered with the fixed element sprues 140a, 140b, 140c, and 140d. The fixed element sprues 140a, 140b, 140c and 140d are aligned with the casting sprues 11a, 11b, 11c, and 11d, respectively, which in turn lead to the molds 90a, 90b, 90c, and 90d respectively.

The cam assembly 180 which cooperates with the locking device 170 to control the positioning of the nozzle 37 and the rotation of the screw conveyor 13 is shown in Fig. 8. As previously described with reference to corresponding parts, the lands 181a, 181b, 181c, and 181d on the cam 181 actuate the microswitch 184 to stop the backward rotation of the conveyor; they correspond in radial position to the stopping surfaces on the cam 171 of the locking device. Again, the microswitches 183a, 183b, 183c, and 183d are connected into the control circuits for the closing of molds 90a, 90b, 90c, and 90d, respectively, and the corresponding switch must be closed by the land 182a before the mold will close. The land 182a rotates with and is oriented the same way as the nozzle sprue 37a.

The four-mold embodiment operates in the same manner as that embodiment previously described. Referring to Figs. 6, 7, and 8, after the mold 90c has been filled and backward rotation of the screw conveyor started by the operator, the nozzle also rotates in a counterclockwise direction with the sleeve and conveyor. As the cam stopping surfaces 171c and 171d pass the stop members 72, the land 181a actuates the microswitch 184 which stops rotation of the conveyor, sleeve and nozzle in the counterclockwise direction. At this time, the nozzle sprue 37a is slightly misaligned with the fixed element sprue 140a, and the land 182a has closed the microswitch 183a in the control circuit for the mold 90a. When this mold is closed by the operator, it trips a switch mounted thereon which starts forward or clockwise rotation of the screw conveyor. The slight misalignment of the sprues 37a and 140a is thus corrected by the previously-described action, and the filling process proceeds until the mold is filled and a new cycle started.

All other phases of operation as well as parts are as previously described and no further description is deemed necessary.

It is pointed out that various changes may be made by one skilled in the art without departing from the spirit of the invention or the scope of the appendant claims. Such changes might include the adaptation of the invention to use with various numbers of molds as well as variations in details and arrangements of parts.

Having described the invention, it is claimed:

1. In an injection molding apparatus, a feeding head comprising a rotatable sleeve, a nozzle mounted on said sleeve to rotate therewith, a fixed element having a bearing surface engaged by said nozzle and being provided with a plurality of spaced sprues, said nozzle being provided with a discharge sprue registerable with said fixed element sprues, a feeding means for forcing fluid material forwardly through said sleeve and nozzle, power means for driving said feeding means in forward and reverse directions, and power transmission means between said power means and said sleeve adapted to positively connect said power means and said sleeve for positioning said nozzle sprue only when said power means is rotating in said reverse direction.

2. In an injection molding apparatus, a feeding head comprising a rotatable nozzle, a fixed element having a bearing surface engaged by said nozzle, said nozzle being provided with a discharge sprue, said fixed element being provided with a plurality of spaced sprues, means for rotating said nozzle intermittently and alternately in forward and reverse directions, and stop means coacting with said nozzle for aligning said nozzle sprue and one of said fixed element sprues and for preventing rotation of said sleeve only in said reverse direction, whereby forward rotation indexes said nozzle sprue past the next fixed element sprue and reverse rotation rotates said nozzle against said stop means for aligning said nozzle sprue and said next fixed element sprue.

3. In an injection molding apparatus, a feeding head comprising a rotatable sleeve, a nozzle mounted on said sleeve to rotate therewith, a fixed element having a bearing surface engaged by said nozzle and being provided with a plurality of spaced sprues, said nozzle being provided with a discharge sprue registerable with said fixed element sprues, power means adapted to rotate in forward and reverse directions, power transmission means between said power means and said sleeve comprising an overrunning clutch adapted to positively connect said power means and said sleeve only when said power means is rotating in said reverse direction, and means responsive to the rotative position of said sleeve and said nozzle to stop rotation of said power means in said reverse direction.

4. In an injection molding apparatus, a feeding head comprising a screw conveyor, a rotatable sleeve surrounding said screw conveyor, a nozzle mounted on said sleeve to rotate therewith, said nozzle enclosing the tip of said screw conveyor, a fixed element having a bearing surface engaged by said nozzle and being provided with a plurality of spaced sprues, said nozzle being provided with a discharge sprue registerable with said fixed element sprues, power means for rotating said screw conveyor in feed and reverse directions, power transmission means between said screw conveyor and said sleeve comprising an overrunning clutch adapted to positively connect said screw conveyor and said sleeve only when said screw conveyor is rotating in said reverse direction.

5. In an injection molding apparatus, a feeding head comprising a screw conveyor, a rotatable sleeve surrounding said screw conveyor, a nozzle mounted on said sleeve to rotate therewith, said nozzle enclosing the tip of said screw conveyor, a fixed element having a bearing surface engaged by said nozzle and being provided with a plurality of spaced sprues, said nozzle being provided with a discharge sprue registerable with said fixed element sprues, power means for rotating said screw conveyor in forward and reverse directions, power transmission means between said screw conveyor and said sleeve comprising an overrunning clutch, and means for locking said sleeve and nozzle against rotation in said forward direction whenever said nozzle sprue is registered with one of said fixed element sprues.

6. In an injection molding apparatus, a feeding head comprising a screw conveyor, a rotatable sleeve surrounding said screw conveyor, a nozzle mounted on said sleeve to rotate therewith, said nozzle enclosing the tip of said screw conveyor, a fixed element having a bearing surface engaged by said nozzle and being provided with a plurality of spaced sprues, said nozzle being provided with a sprue registerable with said fixed element sprues, power means for rotating said screw conveyor in feed and reverse directions, power transmission means between said screw conveyor and said sleeve comprising an overrunning clutch adapted to positively connect said screw conveyor and said sleeve only when said screw conveyor is rotating in said reverse direction, and means responsive to the rotative position of said sleeve and said nozzle to stop rotation of said screw conveyor in said reverse direction.

7. In an injection molding apparatus, a feeding head comprising a screw conveyor, a rotatable sleeve surrounding said screw conveyor, a nozzle mounted on said sleeve to rotate therewith, said nozzle enclosing the tip of said screw conveyor, a fixed element having a bearing surface engaged by said nozzle and being provided with a plurality of spaced sprues, said nozzle being provided with a discharge sprue registerable with said fixed element sprues, power means for rotating said screw conveyor in forward and reverse directions, power transmission means between said screw conveyor and said sleeve comprising an overrunning clutch adapted to positively connect said screw conveyor and said sleeve only when said screw conveyor is rotating in said reverse direction, means responsive to the rotative position of said sleeve and said nozzle to stop rotation of said screw conveyor in said reverse direction, and means for locking said sleeve and nozzle against rotation in said forward direction whenever said nozzle sprue is aligned with one of said fixed element sprues.

8. In an injection molding apparatus, a feeding head comprising a screw conveyor, a rotatable sleeve surrrounding said screw conveyor, a nozzle mounted on said sleeve to rotate therewith, a fixed element having a bearing surface engaged by said nozzle and being provided with a plurality of spaced sprues, said nozzle being provided with a discharge sprue registerable with said fixed element sprues, power means for rotating said screw conveyor in feed and reverse directions, power transmission means between said power means and said sleeve adapted to positively connect said sleeve and power means only when said screw conveyor is rotating in said reverse direction.

9. In an injection molding apparatus, a feeding head comprising a screw conveyor, a rotatable sleeve surrounding said screw conveyor, a nozzle mounted on said sleeve to rotate therewith, a fixed element having a bearing surface engaged by said nozzle and being provided with a plurality of spaced sprues, said nozzle being provided with a discharge sprue registerable with said fixed element sprues, power means for rotating said screw conveyor in feed and reverse directions, power transmission means between said power means and said sleeve adapted to positively connect said sleeve and power means only when said screw conveyor is rotating in said reverse direction, and stop means coacting with said sleeve for aligning respective sprues and for preventing rotation of said sleeve only when said screw conveyor rotates in said feed direction, whereby during reverse rotation said screw conveyor does not feed but said nozzle sprue is indexed to the next fixed element sprue and during feed rotation of said screw conveyor the sleeve is urged against said locating stop means to urge respective sprues into registration.

ARTHUR S. WATKINS.
GEORGE L. WARSACK.

References Cited in the file of this patent

UNITED STATES PATENTS

| Number | Name | Date |
|---|---|---|
| 1,760,902 | Grattan | June 3, 1930 |
| 1,960,515 | Shield | May 29, 1934 |
| 2,367,204 | Cousino | Jan. 16, 1945 |